United States Patent [19]
Uecker et al.

[11] Patent Number: 6,066,832
[45] Date of Patent: May 23, 2000

[54] WELDING ARC VOLTAGE SENSE LEAD

[75] Inventors: James Uecker; Todd Holverson, both of Appleton; Richard Hutchison, New London, all of Wis.

[73] Assignee: Illinois Tool Works Inc., Glenview, Ill.

[21] Appl. No.: 09/065,296

[22] Filed: Apr. 23, 1998

[51] Int. Cl.[7] .................................................. B23K 9/10
[52] U.S. Cl. ..................................... 219/137; 219/130.31
[58] Field of Search ........................... 219/137.71, 137.9, 219/137.63, 130.31, 130.32, 130.33

[56] References Cited

U.S. PATENT DOCUMENTS

| | | | |
|---|---|---|---|
| 3,978,311 | 8/1976 | Toth | 219/131 |
| 4,423,306 | 12/1983 | Fox | 219/137.9 |
| 4,510,373 | 4/1985 | Cox et al. | 219/137.71 |
| 4,853,516 | 8/1989 | Jullien et al. | 219/137.9 |
| 5,086,208 | 2/1992 | Habermann | 219/137.71 |
| 5,349,159 | 9/1994 | Mita et al. | 219/137 |
| 5,384,447 | 1/1995 | Raloff et al. | 219/137.63 |
| 5,521,354 | 5/1996 | Ludewig et al. | 219/130.01 |
| 5,698,122 | 12/1997 | Lubieniecki et al. | 219/137.31 |

*Primary Examiner*—Patrick Ryan
*Assistant Examiner*—Anjan Dey
*Attorney, Agent, or Firm*—George R. Corrigan

[57] ABSTRACT

A welding cable designed to work with a welding system that does not have a pull-type torch is disclosed. The cable includes an electrode lead and an arc voltage sense lead. An insulating jacket is disposed about the electrode lead. The arc voltage sense lead is physically attached to the insulating jacket, along at least a substantial portion of the insulating jacket. The torch lead is preferably fixedly attached to the torch. The sense lead is connected to a controller. The sense lead may be disposed inside or attached outside the insulating jacket. The arc voltage sense lead may be attached to the electrode lead, rather than the torch itself.

27 Claims, 4 Drawing Sheets

WELDING ARC VOLTAGE SENSE LEAD

FIELD OF THE INVENTION

The present invention relates generally to the art of electric arc welding. More specifically, the invention relates to sensing the welding arc voltage (hereafter arc voltage.

BACKGROUND OF THE INVENTION

It is well known that control of the arc voltage (and thus knowledge of the arc voltage) is helpful to ensure a high quality weld. (As used herein arc voltage refers to the voltage between the electrode and the workpiece.) Prior art commercial welding systems have typically sensed the voltage at the power source or at the wire feeder, and have used this voltage as a proxy for the actual arc voltage between the welding electrode and the workpiece. By doing so, all voltage drops along the weld cable (due to intrinsic resistance and intrinsic inductance) are ignored. This type of voltage sensing was the best that could practically be achieved in the prior art, and prior art control schemes were forced to make do with this inaccurate voltage sensing. However, advanced control schemes benefit from more accurate arc voltage feedback: Voltage drops due to intrinsic line inductance and resistance should not be ignored. One such advanced control scheme is described in U.S. patent application Ser. No. 09/024,944, Method and Apparatus For Short Arc Welding, filed Feb. 17, 1998, which was invented by the present inventors, and owned by the present assignee, and which is hereby incorporated by reference. Accordingly, the inaccurate prior art voltage sensing techniques need improvement.

Non-commercial prior art welding systems have used a separate arc voltage sense wire that was clipped to a point near the welding electrode to more accurately measure the arc voltage. The use of a separate sensing lead is problematic in that it adds another loose wire to the welding system which can get in the way of the operator, potentially damaging the sense lead itself. Another problem with the prior art method is that it is only temporarily attached near the welding electrode and therefore can easily become unattached during the welding operation. Thus, the non-commercial separate lead is not useful (and has not been employed) in commercial applications. Prior art commercial systems use a similar work piece sense lead, that is clipped to the work piece. This type of clip-on work piece sense lead suffers from the same problems as a clipped on electrode sense lead.

Another prior art sense lead is used with a pull-type wire feeder. Such a wire feeder has a motor at the torch end of the weld cable that pulls the wire to the torch. Because a wire feed motor (including power and control leads) is located at the torch, the voltage was sensed there. However, the design is not useful for systems that have the wire feed motor located remotely from the torch.

Accordingly, it is desirable in the art to provide an arc voltage sense lead that does not add an extra loose wire to the welding apparatus. Preferably, such a sense lead is permanently attached. Also, such a sense lead is preferably attached near the welding arc, to more accurately and reliably sense the arc voltage, and is useful with wire feeders where the torch is not located near the wire feed motor.

SUMMARY OF THE PRESENT INVENTION

A first aspect of the invention is a cable for providing a weld current to a welding arc. The cable is designed to work with a welding system that does not have a pull-type torch. The cable includes an electrode lead and an arc voltage sense lead. An insulating jacket is disposed about the electrode lead. The arc voltage sense lead is physically attached to the insulating jacket, along at least a substantial portion of the insulating jacket.

The electrode lead has a first end adapted to be in electrical communication with a source of power in one embodiment. The electrode lead has a torch attached to a second end in another embodiment. The at least a substantial portion of the insulating jacket is between the first end and the torch.

The sense lead has a first end adapted to be in electrical communication with a controller, and a second end attached to a torch in another alternative. The arc voltage sense lead second end is fixedly attached to a torch in yet another embodiment.

The insulating jacket is disposed about the arc voltage sense lead in one embodiment, and the arc voltage sense lead is located outside the insulating jacket in another embodiment.

A second aspect of the invention is a welding torch/cable assembly, for a welding system that does not have a pull-type wire feeder. The assembly includes an electrode lead and a torch attached to a first end of the electrode lead. An arc voltage sense lead has a first end fixedly attached to the torch.

The electrode lead has a second end adapted to be in electrical communication with a source of power in one embodiment. The arc voltage sense lead has a second end adapted to be in electrical communication with a controller, in another embodiment.

An insulating jacket is disposed about the electrode lead and the arc voltage sense lead is physically attached to the insulating jacket in another embodiment. The insulating jacket is disposed about the arc voltage sense lead, in another embodiment, and the arc voltage sense lead is located outside the insulating jacket in an alternative embodiment.

A third aspect of the invention is a welding system of the type not having a pull-type wire feeder. The system, includes a source of power and a controller connected to the source of power. An electrode lead has a first end and a second end. The second end of the electrode lead is adapted to be in electrical communication with the source of power. A torch is attached to the first end of the electrode lead. An arc voltage sense lead is provided, and has a first end in electrical communication with the controller. An insulating jacket is disposed about the electrode lead. The arc voltage sense lead is physically attached to the insulating jacket along at least a substantial portion of the insulating jacket.

The arc voltage sense lead has a second end attached to the torch in one embodiment. It is fixedly attached to the torch in another embodiment.

The insulating jacket is disposed about the arc voltage sense lead, in one alternative, and the arc voltage sense lead is located outside the insulating jacket in another alternative.

The arc voltage sense lead second end is attached to the electrode lead, rather than the torch, in another embodiment.

Yet another aspect of the invention is a welding system of the type that does not have a pull-type wire feeder. The system includes a source of power and a controller that controls the source of power. An electrode lead has a first end and a second end. The second end is adapted to be in electrical communication with the source of power, and the first end of the electrode lead is attached to a torch. A voltage sense lead has a first and second end. The first end is fixedly attached to the torch, and the second end is in electrical communication with the controller.

An insulating jacket is disposed about the electrode lead, and the arc voltage sense lead is physically attached to the insulating jacket along at least a substantial portion of the insulating jacket in one embodiment. The insulating jacket is disposed about the arc voltage sense lead in one alternative, the arc voltage sense lead is located outside the insulating jacket in another alternative.

A fifth aspect of the invention is a welding torch for providing a weld current to a welding arc from a welding system that does not have a pull-type wire feeder. The torch includes a weld current carrying conductor and an arc voltage sense lead. A first end of the sense lead is fixedly attached to the weld current carrying conductor.

The arc voltage sense lead has a second end adapted to be in electrical communication with a controller in an alternative embodiment.

Other principal features and advantages of the invention will become apparent to those skilled in the art upon review of the following drawings, the detailed description and the appended claims.

Figure 1:
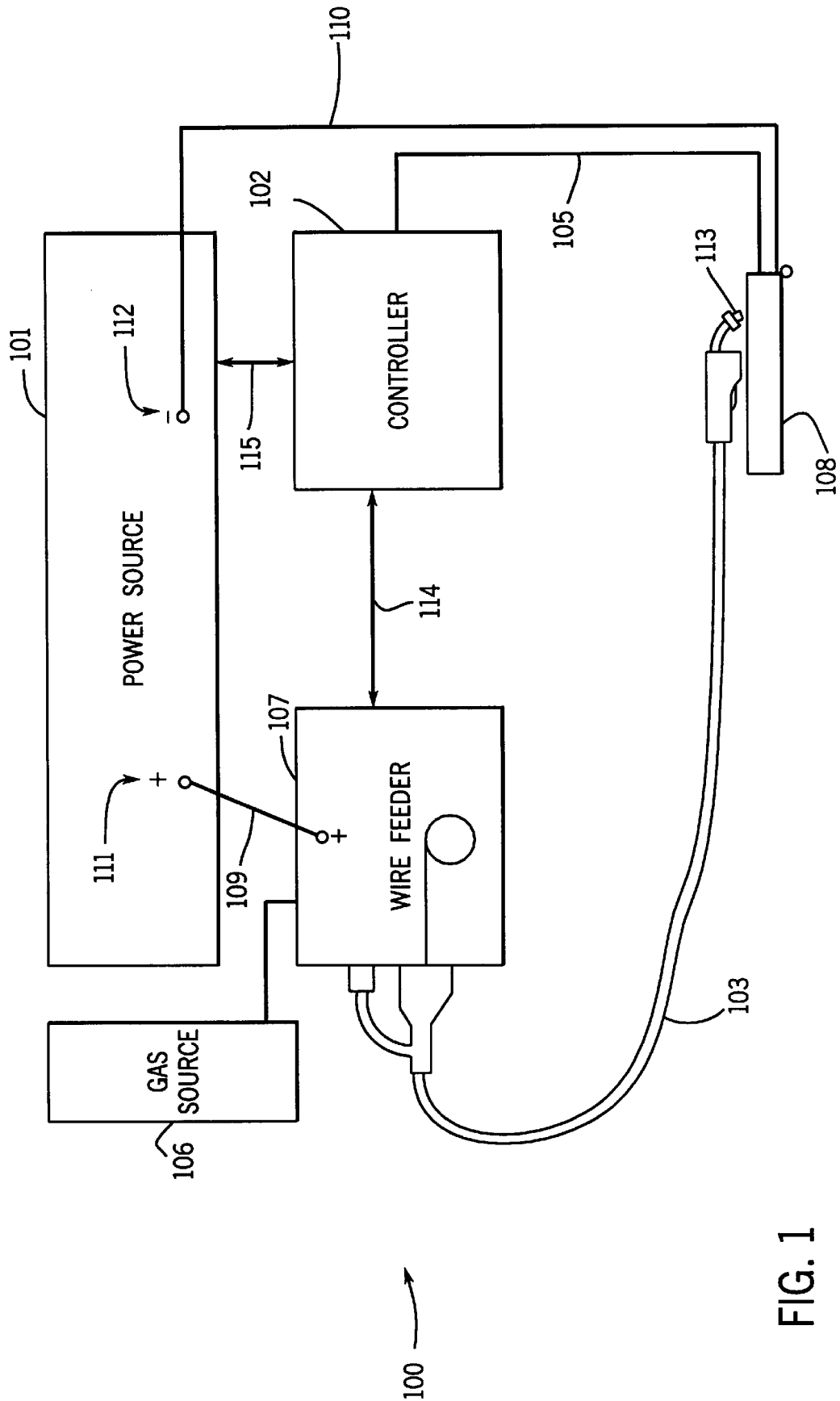
FIG. 1 is a schematic drawing of the preferred embodiment of a GMAW system.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENT

While the present invention will be illustrated with reference to a specific welding system, it should be understood at the outset that other welding systems can also be employed and the arc voltage sensed. Also, while the present invention will be illustrated with reference to a Gas Metal Arc Welding (GMAW) system (such as a MILLER Invision™ 456P power supply and S60M™ wire feeder), and particular cables, torches, connectors etc., the present invention is not limited to GMAW systems or the particular cable, torches, connectors, etc. described herein.

Generally, the present invention provides an apparatus and system for sensing the arc voltage. Preferably, the voltage is sensed near the welding arc. An arc voltage sense lead and the weld current carrying conductor are enclosed under the same insulating jacket, in the preferred embodiment. This configuration allows a single cable assembly to both deliver weld current to the welding arc, and to sense the resulting arc voltage. The arc voltage is sensed (the point where the arc voltage sense lead is electrically connected) at the torch body, in the preferred embodiment. The control scheme may then use the relatively accurate sensed arc voltage to control the process.

Referring to FIG. 1, a GMAW system 100 generally includes a power supply 101, a controller 102, a welding torch/cable assembly 103 (including a weld cable hose assembly 201 and a gun or torch 202), and a workpiece voltage sense lead 105. GMAW system 100 also includes a shielding gas source 106, a wire feeder 107, a wire feeder weld current lead 109, and a workpiece weld current lead 110. A workpiece 108 is also shown. As used herein, source of power includes the power supply and wire feeder, and any other components that deliver the welding power to the arc.

An electrode stud 111 of power supply 101 is electrically connected to welding torch/cable assembly 103 via wire feeder 107 and wire feeder weld current lead 109, in the preferred embodiment. A workpiece stud 112 of power supply 101 is electrically connected to workpiece 108 via weld current workpiece lead 110. An electrical weld circuit for the flow of weld current through workpiece 108 is thereby created, and includes power supply 101, workpiece weld current lead 110, workpiece 108, welding torch/cable assembly 103, wire feeder 107, and wire feeder weld current lead 109.

An arc voltage sense lead 104 (only one end of sense lead 104 may be seen) is disposed within cable hose assembly 201 (i.e. physically attached thereto). The sense lead is terminated at one end within gun 202 (as used herein gun or torch refer to any mechanism between which it and the workpiece the arc is formed). The other end is attached to wire feeder 107. Sense lead 104 senses the voltage at gun 202, and provides it to controller 102, through wire feeder 107. Sense lead 104 carries virtually no current, so it can have a very small diameter, without incurring the resistive or inductive voltage losses found in the weld current conductor of cable hose assembly 201. Sense lead 104 is preferably insulated along the length of the weld current conductor. Thus, sense lead 104 more accurately senses arc voltage, without creating a physically separated lead susceptible to damage, and/or attached to the outside of the gun.

Figure 2:
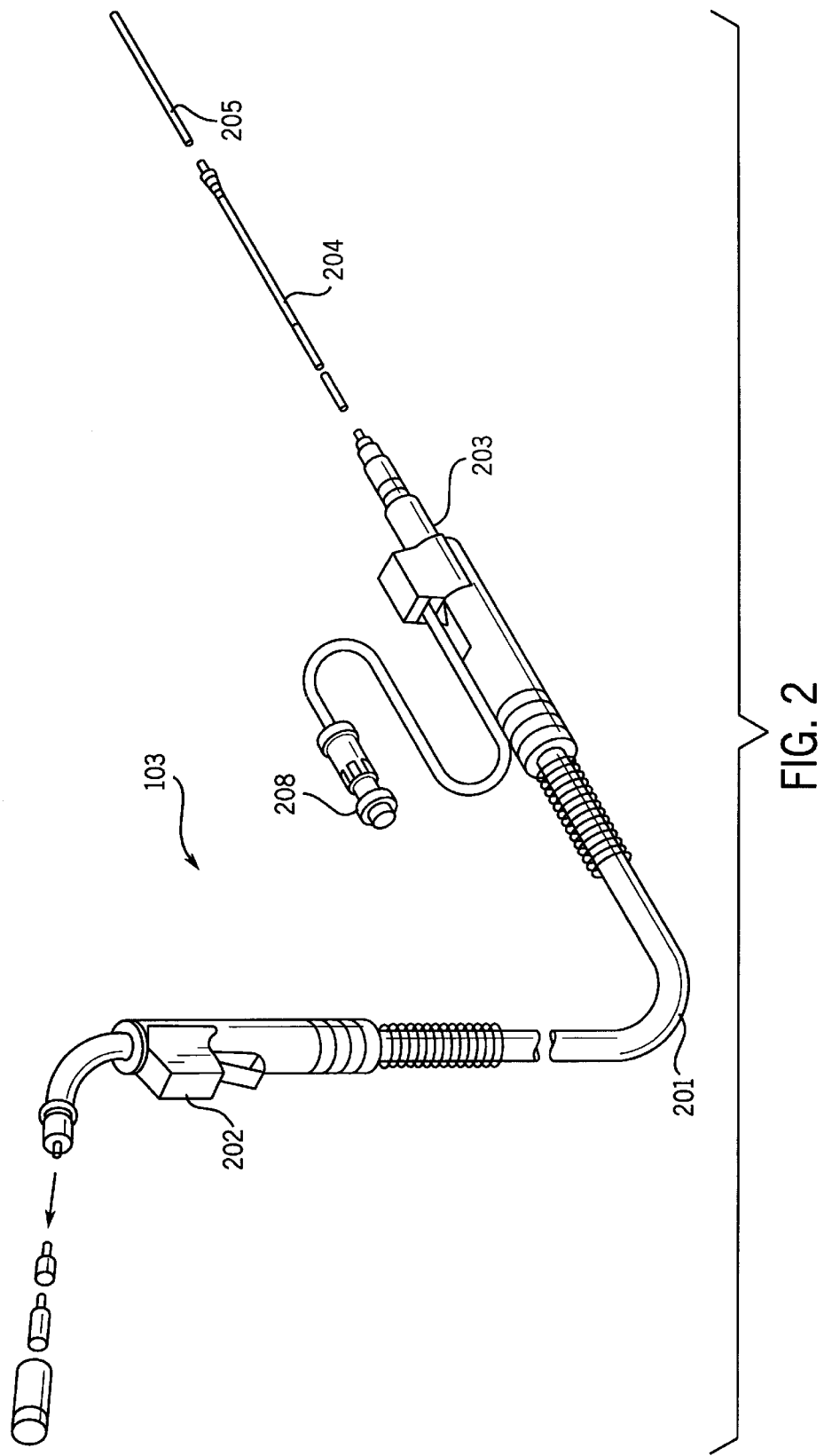
FIG. 2 is a detailed drawing of the preferred embodiment of a welding torch/cable assembly.

FIG. 2 illustrates a preferred embodiment of welding torch/cable assembly 103 consisting of cable or cable hose assembly 201, a torch or gun 202 attached to one end of cable hose assembly 201, a power source connector 203 attached to the other end of cable hose assembly 201, a monocoil liner 204 located near the axial center of welding cable hose assembly 201, and a welding wire 205, located near the axial center of monocoil liner 204.

During a typical welding operation, wire feeder 107 pushes wire 205 through power source connector 203, and through monocoil liner 204 along the length of welding torch/cable assembly 103 to torch or gun 202. In alternative embodiments wire, gas, power and/or water may be provided through connector 203. A connector 208 connects to wire feeder 107. The control wires for the torch or gun 202 (such as speed, and on/off) are provided within cable hose assembly 201, and through connector 208 to, eventually, controller 102. Sense lead 104 may also be provided through connector 208.

Figure 3:
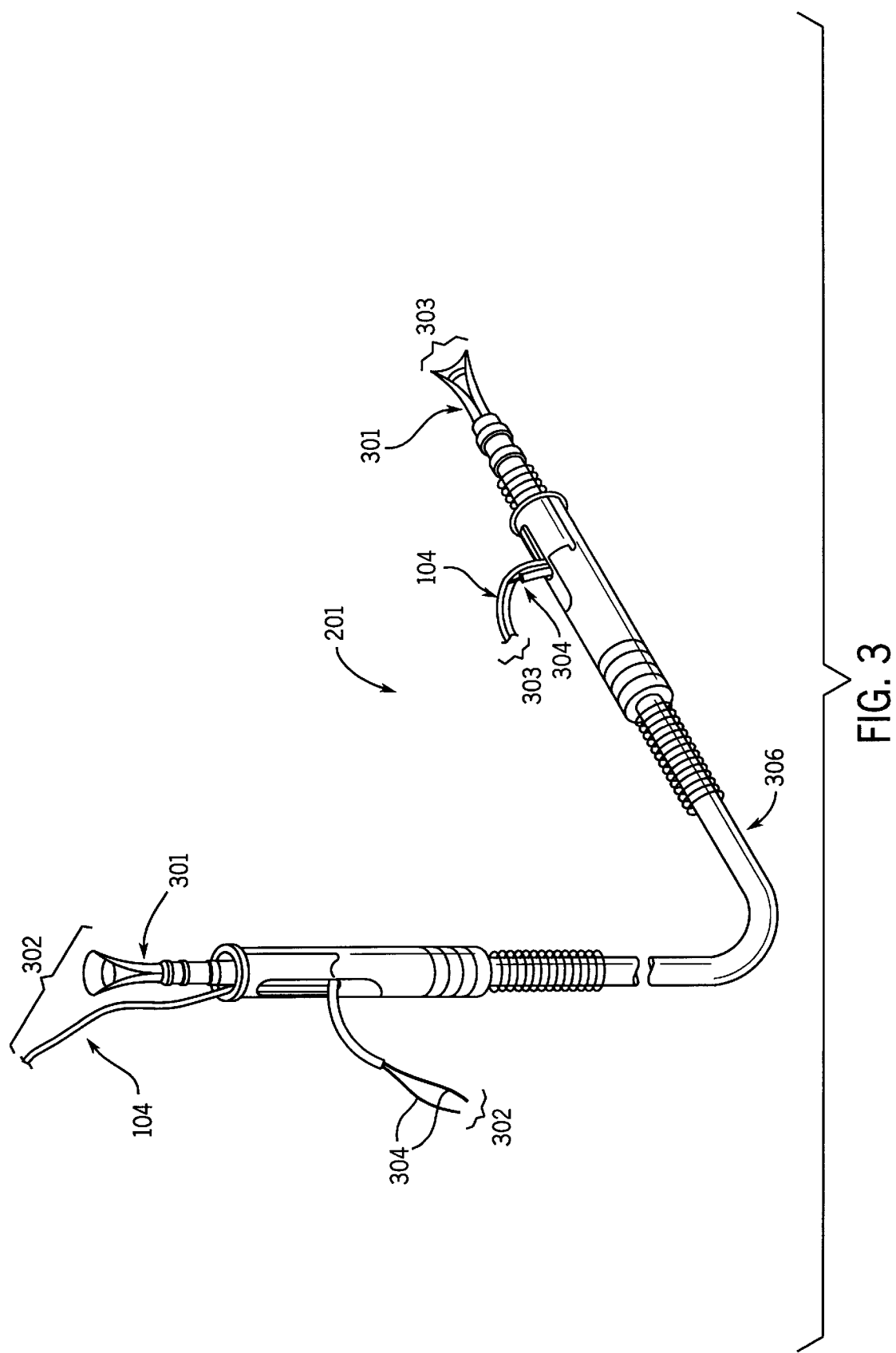
FIG. 3 is a detailed drawing of the preferred embodiment of a cable hose assembly.

With reference to FIG. 3, a preferred embodiment of cable hose assembly 201 is shown as having an electrode lead 301 for carrying a weld current from wire feeder 107 to torch 202. Electrode lead 301 has a torch end 302, and a power source end 303. Electrode lead 301 is preferably made of stranded copper, but any type of electrical current carrying conductor could be used with the present invention. Likewise, in the preferred embodiment, cable hose assembly 201 is of the coaxial wire feed type, but it is to be understood that the present invention is not limited to coaxial-type cable hose assemblies.

A plurality of trigger leads 304 (such as those disposed in connector 208), arc voltage sense lead 104, and insulating jacket 306 are part of cable hose assembly 201. Like electrode lead 301, trigger leads 304 and arc voltage sense lead 104 have a torch end 302 and a power source end 303, as shown in FIG. 3.

Insulating jacket 306 is made of an electrical non-conducting material and is disposed around electrode lead 301, trigger leads 304, and arc voltage sense lead 104, along a substantial portion of insulating jacket 306, in the preferred embodiment. It should be noted that although insulating jacket 306 is disposed about arc voltage sense lead 104 in the preferred embodiment, the present invention is not limited to this particular configuration.

Arc voltage sense lead 104 is physically attached to the outside of insulating jacket 306 along a substantial portion of insulating jacket 306, in an alternative embodiment of the present invention. Physically attached, as used herein, includes disposed within or mounted to the outside. Along a substantial portion of the jacket or cable, as used herein, means along at least a length of the jacket or cable so as to have the jacket and sense lead effectively to be a single cable providing both weld current and arc voltage sensing capabilities. The attachment may be by straps, glue, rings, or any other mechanism.

Torch 202 is attached to torch end 302 of cable hose assembly 201. (As used herein cable refers to at least the current-carrying wire and its insulation. Cable hose assembly refers to at least the cable, the gas hose, and the jacket.) Torch 202, depicted in FIG. 4, includes a plastic handle 401, a trigger switch assembly 402, a torch body 403, a neck 404, a contact tip adapter 405, a contact tip 406, and a nozzle 407, in a preferred embodiment. It should be realized that although the preferred embodiment discloses a specific torch configuration, the present invention is not limited to this specific configuration.

Torch body 403 is made of brass and is permanently clamped to torch end 302 of electrode lead 301, in the preferred embodiment. One end of neck 404 is threaded into torch body 403. The other end of neck 404, which is made of copper in the preferred embodiment, is threaded into one end of contact tip adapter 405. Contact tip adapter 405 is made of brass in the preferred embodiment. Contact tip 406, which is made of copper in the preferred embodiment, is threaded into the other end of contact tip adapter 405. Electrode wire 205 is fed through cable hose assembly 201, into the center portion of torch 202, and extends out the end of torch 202 through a small hole in contact tip 406. The end portion 408 of electrode wire 205 extending beyond the contact tip 406 is the welding electrode.

Figure 4:
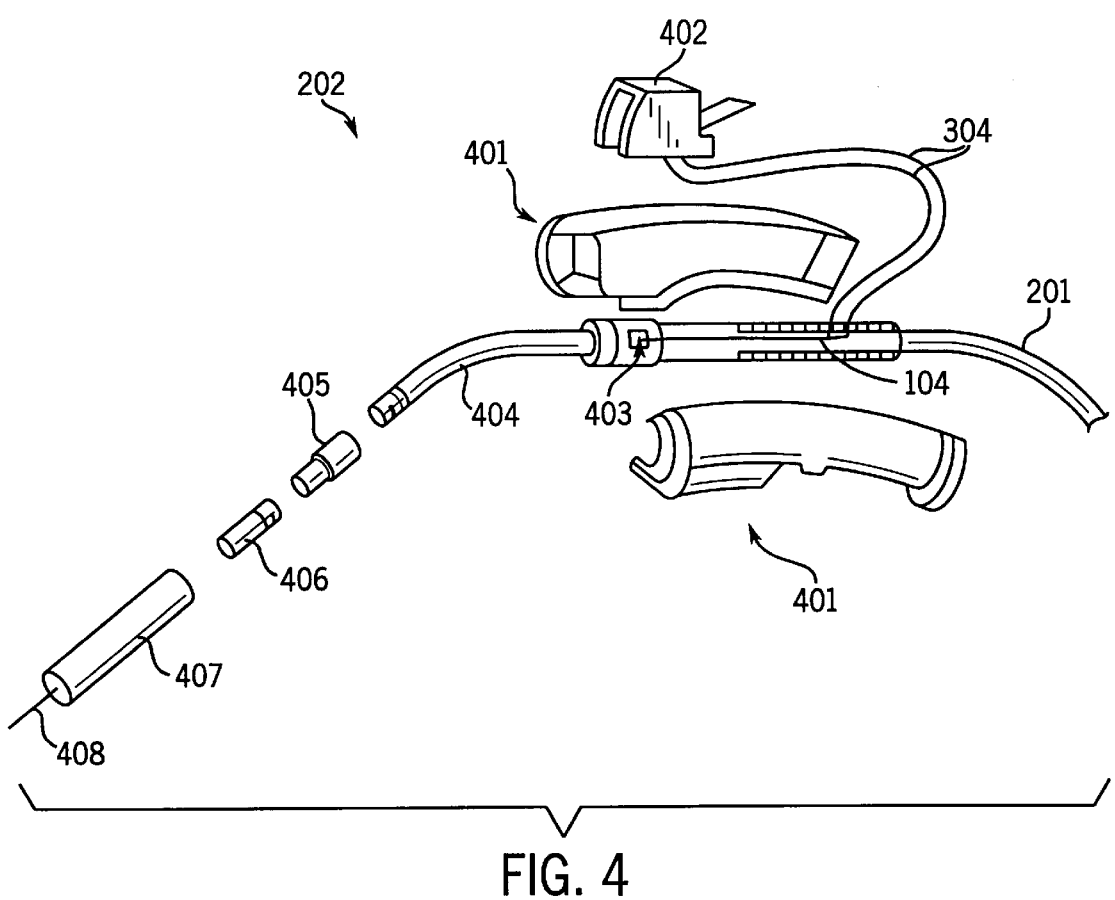
FIG. 4 is a detailed drawing of the preferred embodiment of a welding torch.

When assembled as illustrated in FIG. 4, the combination of brass torch body 403, copper neck 404, brass contact tip adapter 405, and copper contact tip 406 provide an electrical conducting path for the weld current to flow from electrode lead 301 to welding electrode 408.

Handle 401 has a left half and a right half which are clamped together around cable hose assembly 201 in the vicinity of the torch end 302 of trigger leads 304. When mounted onto cable hose assembly 201, handle 401 encloses torch body 403 and torch end 302 of trigger leads 304 are allowed to protrude from an opening in mounted handle 401.

Torch end 302 of trigger leads 304 are electrically connected to trigger switch assembly 402 which is mounted to handle 401 at the point where trigger leads 304 protrude from mounted handle 401.

Also located in the vicinity of mounted handle 401 is torch end 302 of arc voltage sense lead 104. Torch end 302 of arc voltage sense lead 104 is electrically connected and fixed to torch body 403 via a tapped hole in torch body 403 using a standard screw, or a set screw.

Although the preferred embodiment discloses electrically connecting torch end 302 of arc voltage sense lead 104 to torch body 403, the present invention is not limited to this particular electrical connection. An alternative embodiment of the invention has torch end 302 of arc voltage sense lead 104 electrically connected to any electrical conducting component of torch 202. These other electrical conducting components include copper neck 404, contact tip adapter 405, and contact tip 406, in the preferred embodiment.

Torch end 302 of arc voltage sense lead 104 is connected directly to electrode lead 301 at a location near torch 202 in still another alternative embodiment of the present invention. Also, the connection may be permanent, using other mechanisms, or temporary.

Power source end 303 of cable hose assembly 201 is connected to power source connector 203, in the preferred embodiment. Power source connector 203 is electrically connected to electrode lead 301 to allow for weld current to flow from power supply 101 to electrode lead 301 via wire feeder 107 and wire feeder weld current lead 109. The power source end 303 of both trigger leads 304 and arc voltage sense lead 104 are electrically connected to controller 102.

During welding, an arc voltage is established across a gap 113. This gap or arc voltage is sensed by arc voltage sense leads 104 and 105, which are in electrical communication with controller 102 through wire feeder 107 (i.e. either directly or indirectly electrically connected thereto). A 14 pin connector is used in one embodiment, and the arc voltage is provided using one or more pins therein. Controller 102 measures and processes the arc voltage sensed by arc voltage sense leads 104 and 105 and sends resulting electrical control signals to wire feeder 107 and/or power supply 101 via a plurality of control lines 114 and 115 respectively. These control signals direct wire feeder 107 and/or power supply 101 to adjust various welding parameters in response to the sensed arc voltage.

Another alternative provides that work sense lead 105 be disposed within, or attached to, work piece weld current lead 110. Work sense lead 105 may then be held out of the way, as is electrode sense lead 104.

A control scheme such as one described in U.S. patent application Ser. No. 09/024,944 uses arc voltage feedback to control the output in real-time (i.e. within a particular cycle or portion of a cycle). The present invention is well suited to providing arc voltage feedback for use in real-time control of the arc. Accordingly, in one embodiment the control includes a microprocessor or analog circuit that controls the output in real-time, in response to the arc voltage.

Numerous modifications may be made to the present invention which still fall within the intended scope hereof. Thus, it should be apparent that there has been provided in accordance with the present invention a method and apparatus for sensing arc voltage at a point in close proximity to the welding arc that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A cable for providing a weld current to a welding arc from a welding system that does not have a motorized gun wire feeder, comprising:
   an electrode weld current lead;
   an arc voltage electrode sense lead; and
   an insulating jacket disposed about the electrode weld current lead, wherein the arc voltage electrode sense lead is physically attached to the insulating jacket along at least a substantial portion of the insulating jacket.

2. The cable of claim 1 wherein the electrode weld current lead has a first end adapted to be in electrical communication with a source of power.

3. The cable of claim 2 wherein the electrode weld current lead has a torch attached to a second end, wherein the at least a substantial portion of the insulating jacket is between the first end and the torch.

4. The cable of claim 1 wherein the arc voltage electrode sense lead has a first end adapted to be in electrical communication with a controller, and a second end attached to a torch.

5. The cable of claim 4 wherein the arc voltage electrode sense lead second end is fixedly attached to a torch.

6. The cable of claim 1 wherein the insulating jacket is disposed about the arc voltage electrode sense lead.

7. The cable of claim 1 wherein the arc voltage electrode sense lead is located outside the insulating jacket.

8. The cable of claim 1 wherein the arc voltage electrode sense lead is fixedly attached to a torch.

9. A welding torch/cable assembly, for providing a weld current to a welding arc from a welding system that does not have a pull-type wire feeder, comprising:
   an electrode weld current lead;
   a torch attached to a first end of the electrode lead; and
   an arc voltage electrode sense lead having a first end, wherein the sense lead first end is fixedly attached to the torch and in electrical communication with the torch.

10. The welding torch/cable assembly of claim 9 wherein the electrode weld current lead has a second end adapted to be in electrical communication with a source of power.

11. The welding torch/cable assembly of claim 9 wherein the arc voltage electrode sense lead has a second end adapted to be in electrical communication with a controller.

12. The welding torch/cable assembly of claim 11 further comprising an insulating jacket disposed about the electrode weld current lead, wherein the arc voltage electrode sense lead is physically attached to the insulating jacket along at least a substantial portion of the insulating jacket, and wherein the insulating jacket is disposed about the arc voltage electrode sense lead.

13. The welding torch/cable assembly of claim 12 wherein the electrode weld current lead has a second end adapted to be in electrical communication with a source of power.

14. The welding torch/cable assembly of claim 9 further comprising an insulating jacket disposed about the electrode weld current lead, wherein the arc voltage electrode sense lead is physically attached to the insulating jacket, along at least substantial portion of the insulating jacket, and wherein the arc voltage electrode sense lead is located outside the insulating jacket.

15. The welding torch/cable assembly of claim 14 wherein the electrode weld current lead has a second end adapted to be in electrical communication with a source of power.

16. A welding system of the type not having a pull-type wire feeder, for providing a weld current to a welding arc, comprising;
   a source of power;
   a controller, in electrical communication with the source of power;
   an electrode weld current lead with a first end and a second end, wherein the second end is adapted to be in electrical communication with the source of power;
   a torch attached to the first end of the electrode weld current lead;
   an arc voltage electrode sense lead, having a first end in electrical communication with the controller; and
   an insulating jacket disposed about the electrode weld current lead, wherein the arc voltage sense lead is physically attached to the insulating jacket along at least a substantial portion of the insulating jacket.

17. The welding system of claim 16 wherein the arc voltage electrode sense lead has a second end attached to the torch.

18. The welding system of claim 17 wherein the arc voltage electrode sense lead second end is fixedly attached to the torch.

19. The welding system of claim 16 wherein the insulating jacket is disposed about the arc voltage electrode sense lead.

20. The welding system of claim 16 wherein the arc voltage electrode sense lead is located outside the insulating jacket.

21. The welding system of claim 16 wherein the arc voltage electrode sense lead has a second end attached to the electrode weld current lead.

22. The welding system of claim 16 wherein the controller includes means for controlling the output in real-time, in response to the arc voltage.

23. A welding system of the type not having a pull-type wire feeder, for providing a weld current to a welding arc, comprising;
   a source of power;
   a controller, in electrical communication with the source of power;
   an electrode weld current lead with a first end and a second end wherein the second end is adapted to be in electrical communication with the source of power; and
   a torch attached to the first end of the electrode weld current lead;
   an arc voltage electrode sense lead, having a first and second end, wherein the first end is fixedly attached to the torch and in electrical communication with the torch, and the second end is in electrical communication with the controller.

24. The welding system of claim 23 further comprising an insulating jacket disposed about the electrode weld current lead, wherein the arc voltage electrode sense lead is physically attached to the insulating jacket along at least a substantial portion of the insulating jacket, and wherein the insulating jacket is disposed about the arc voltage electrode sense lead.

25. The welding system of claim 23 further comprising an insulating jacket disposed about the electrode weld current lead, wherein the arc voltage electrode sense lead is physically attached to the insulating jacket along at least a substantial portion of the insulating jacket, and wherein the arc voltage electrode sense lead is located outside the insulating jacket.

26. A welding torch for providing a weld current to a welding arc from a welding system that does not have a pull-type wire feeder, comprising:

a torch;

a weld current carrying conductor; and an arc voltage sense lead having a first end, wherein the first end is fixedly attached to weld current carrying conductor and in electrical communication with the weld current carrying conductor.

27. The welding torch of claim 26 wherein the arc voltage sense lead has a second end adapted to be in electrical communication with a controller.

* * * * *